(12) United States Patent
Hohmann et al.

(10) Patent No.: US 11,705,772 B2
(45) Date of Patent: Jul. 18, 2023

(54) CANNED ELECTRIC MOTOR

(71) Applicant: PIERBURG PUMP TECHNOLOGY GMBH, Neuss (DE)

(72) Inventors: Jan Hohmann, Dortmund (DE); Martin Helmis, Neuss (DE); Andreas Sauer, Kaarst (DE); Andreas Loekes, Willich (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 188 days.

(21) Appl. No.: 16/972,616

(22) PCT Filed: Jun. 8, 2018

(86) PCT No.: PCT/EP2018/065166
§ 371 (c)(1),
(2) Date: Dec. 7, 2020

(87) PCT Pub. No.: WO2019/233598
PCT Pub. Date: Dec. 12, 2019

(65) Prior Publication Data
US 2021/0242745 A1    Aug. 5, 2021

(51) Int. Cl.
*H02K 5/12*    (2006.01)
*H02K 5/128*    (2006.01)
*H02K 5/124*    (2006.01)
*H02K 7/14*    (2006.01)
*H02K 5/16*    (2006.01)

(52) U.S. Cl.
CPC ............. *H02K 5/128* (2013.01); *H02K 5/124* (2013.01); *H02K 5/16* (2013.01); *H02K 7/14* (2013.01)

(58) Field of Classification Search
CPC .. F04D 13/0606–13/064; H02K 5/128–5/1285
See application file for complete search history.

(56) References Cited

U.S. PATENT DOCUMENTS

| | | | |
|---|---|---|---|
| 5,641,276 | A | 6/1997 | Heidelberg et al. |
| 9,318,931 | B2 | 4/2016 | Kim |
| 2006/0017339 | A1 | 1/2006 | Chordia et al. |
| 2011/0248586 | A1 | 10/2011 | M'Sadoques et al. |
| 2013/0272904 | A1 | 10/2013 | Hozumi et al. |
| 2016/0134168 | A1 | 5/2016 | Thiery et al. |

FOREIGN PATENT DOCUMENTS

| | | |
|---|---|---|
| DE | 199 43 862 A1 | 3/2001 |
| EP | 2 375 546 A2 | 10/2011 |
| EP | 2 645 542 A2 | 10/2013 |
| JP | 2005-184958 A | 7/2005 |
| WO | WO 93/17484 A1 | 9/1993 |
| WO | WO 2014/198622 A2 | 12/2014 |

*Primary Examiner* — Ramon M Barrera
(74) *Attorney, Agent, or Firm* — Norman B. Thot

(57) ABSTRACT

A canned electric motor for a fluid pump. The canned electric motor includes a static motor frame, a rotor shaft, a rotatable motor rotor which is co-rotatably connected with the rotor shaft, a static motor stator having a stator body which is directly fixed to the static motor frame, and a separating can which fluidically separates the static motor stator from the rotatable motor rotor. The separating can has a first axial support which protrudes radially from an outside of the separating can. The separating can is supported in a first axial direction by the stator body via the first axial support and in a second axial direction by the static motor frame. The first axial direction is opposite to the second axial direction.

20 Claims, 3 Drawing Sheets

CANNED ELECTRIC MOTOR

CROSS REFERENCE TO PRIOR APPLICATIONS

This application is a U.S. National Phase application under 35 U.S.C. § 371 of International Application No. PCT/EP2018/065166, filed on Jun. 8, 2018. The International Application was published in English on Dec. 12, 2019 as WO 2019/233598 A1 under PCT Article 21(2).

FIELD

The present invention is directed to a canned electric motor for a fluid pump, for example, for a liquid coolant pump of a motor vehicle.

BACKGROUND

A motor vehicle electric coolant pump is typically provided to circulate a coolant of a motor vehicle cooling circuit, primarily for cooling an internal combustion engine of the motor vehicle. The electric coolant pump, and in particular the electric motor of the electric coolant pump, must be reliable and failsafe to avoid damage of the internal combustion engine. Coolant pumps are typically provided with a canned electric motor, wherein the moisture-sensitive electromagnetic motor stator and motor electronics are fluidically separated from the motor rotor by a separating can. The motor rotor can as a result be arranged in fluidic contact with the coolant so that no wear-prone dynamic sealings are required for fluid-tightly sealing the rotating rotor shaft which co-rotatably connects the pump wheel with the motor rotor.

DE 199 43 862 A1 describes a coolant pump with a canned electric motor with a static motor frame, a rotatable motor rotor co-rotatably connected with a rotor shaft, a static motor stator with a stator body, and a separating can fluidically separating the motor stator from the motor rotor. The static motor frame separates a pumping chamber from a motor chamber and is provided with a separating can reception defined by a motor frame opening and a support ring. The separating can is fixed at the motor frame by a separate fixing means being press-fitted into the motor frame opening and axially pressing a holding flange of the separating can towards a holding flange of the separating can reception. The separate fixing means requires an additional assembling process. Motor vibrations may also cause the press-fitting connection to become loose.

The coolant pump is provided with a seal ring which is arranged axially between the holding flange of the separating can and the holding flange of the separating can reception to minimize fluid leakage from the pumping chamber into the motor chamber via the gap between the motor frame and the separating can. A loosening of the press-fitting connection which is caused, for example, by motor vibrations can, however, cause significant coolant leakage through the motor frame opening into the motor chamber which can damage or even destroy the electromagnetic motor stator and/or the motor electronics. This can cause a malfunction or even a failure of the coolant pump which can cause severe damage to the internal combustion engine of the motor vehicle.

SUMMARY

An aspect of the present invention is to provide a cost-efficient and reliable canned electric motor for a fluid pump.

In an embodiment, the present invention provides a canned electric motor for a fluid pump. The canned electric motor includes a static motor frame, a rotor shaft, a rotatable motor rotor which is co-rotatably connected with the rotor shaft, a static motor stator comprising a stator body which is directly fixed to the static motor frame, and a separating can which is configured to fluidically separate the static motor stator from the rotatable motor rotor. The separating can comprises a first axial support which is arranged to protrude radially from an outside of the separating can. The separating can is supported in a first axial direction by the stator body via the first axial support and in a second axial direction by the static motor frame. The first axial direction is opposite to the second axial direction.

BRIEF DESCRIPTION OF THE DRAWINGS

The present invention is described in greater detail below on the basis of embodiments and of the drawings in which.

DETAILED DESCRIPTION

Figure 1:
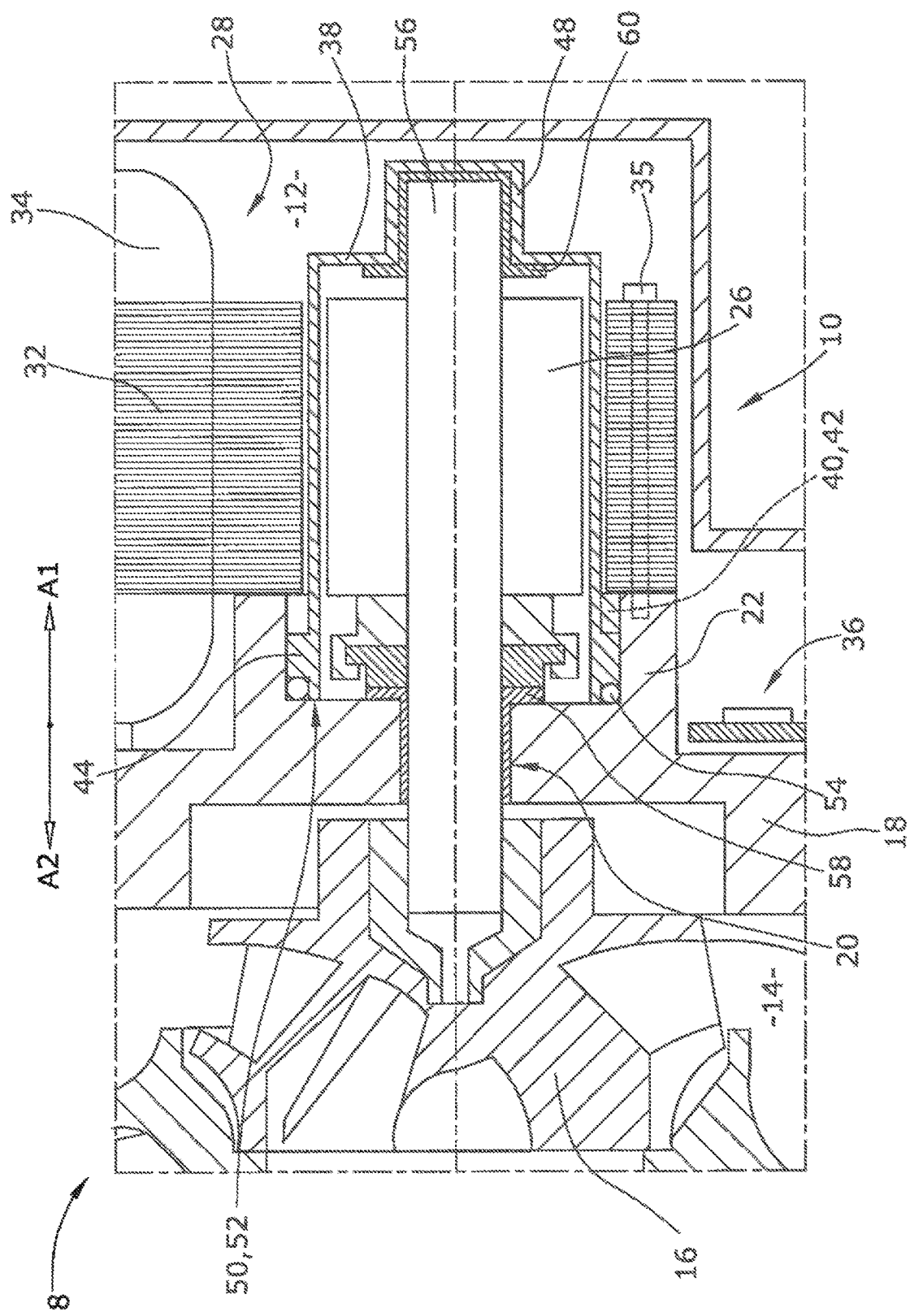
FIG. 1 shows a schematic sectional side view of an electric coolant pump with a canned electric motor according to the present invention.
Figure 2:
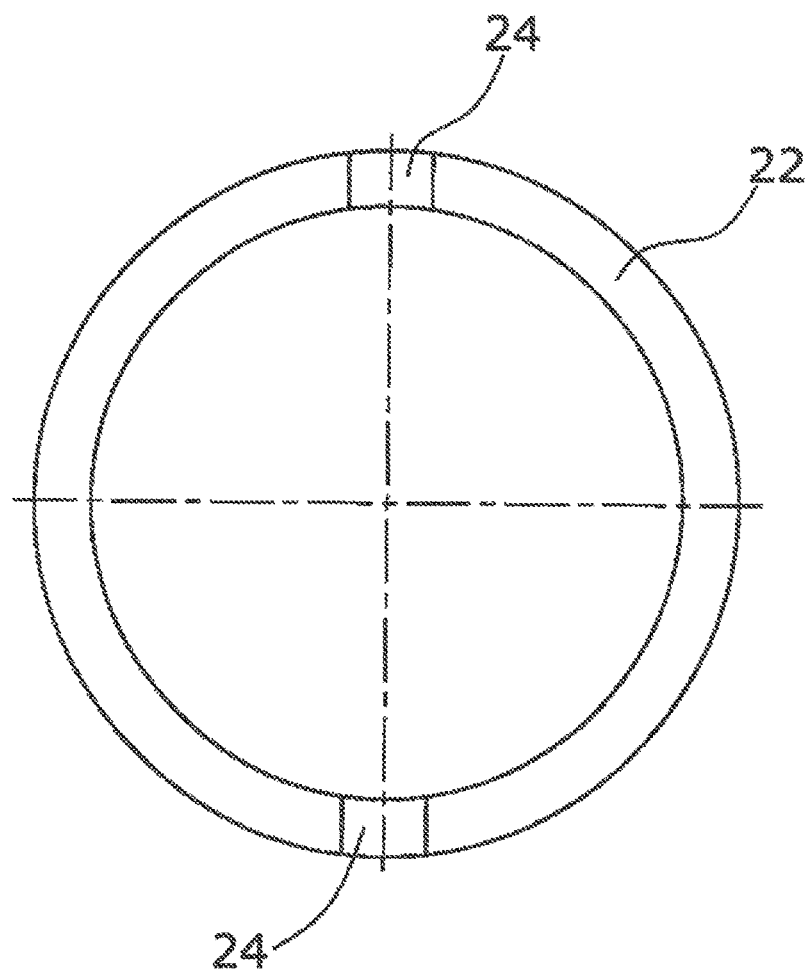
FIG. 2 shows a schematic axial plan view of a separating can reception ring of the electric motor of FIG. 1.
Figure 3:
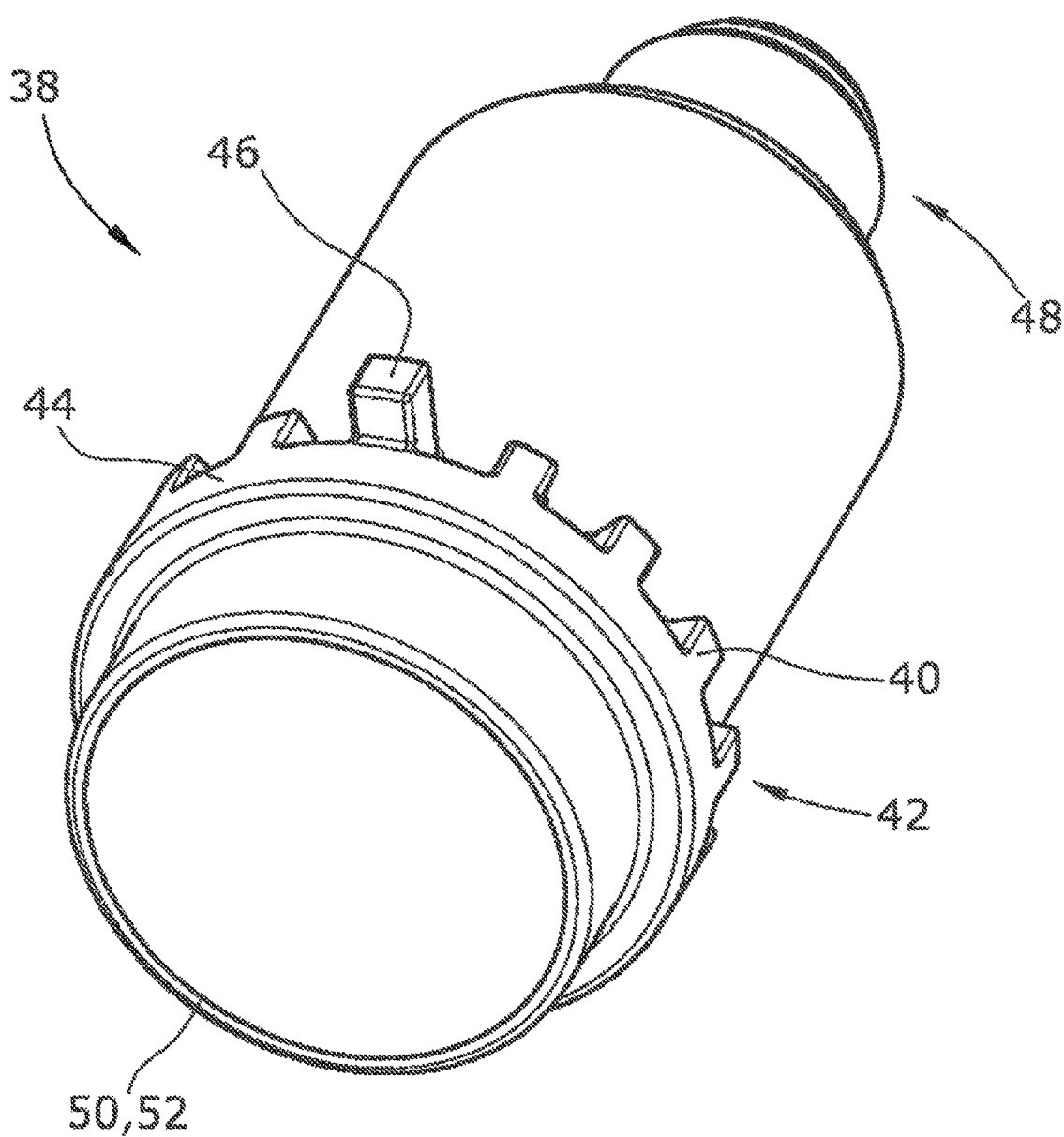
FIG. 3 shows a schematic perspective side view of a separating can of the canned electric motor of FIG. 1.

The canned electric motor according to the present invention is provided with a static motor frame. The motor frame can be provided integrally with a static motor housing or can be a separate element which is attached to the motor housing. The motor frame substantially extends in a radial plane.

The canned electric motor according to the present invention is also provided with a rotatable motor rotor which is co-rotatably connected with a rotor shaft, a static motor stator with a stator body, and a separating can. The separating can extends through the air gap between the motor rotor and the motor stator and fluidically separates the motor rotor from the motor stator and from the motor electronics. The motor rotor can therefore be arranged within a fluidic part of the fluid pump so that the motor rotor can easily be attached to a pump wheel. The moisture-sensitive electromagnetic motor stator and the motor electronics can be arranged at the dry side of the separating can. No expensive and wear-prone dynamic sealings are required.

The stator body is directly fixed to the motor frame so that no additional stator support is required. The stator body can, for example, be screwed to the motor frame to provide a reliable fixation which withstands relatively large leverage forces.

The separating can is provided with an axial support which protrudes radially from an outside of the separating can. The axial support can, for example, be defined by a single support flange which radially surrounds an outside of the separating can. The axial support means can alternatively be defined by several separate support projections which are distributed along the outside circumference of the separating can.

According to the present invention, the separating can is supported in a first axial direction by the stator body via the axial support and in an opposite second axial direction by the motor frame so that no additional fixing is required. This provides for a cost-efficient and reliable fixation of the separating can at the motor frame. No motor frame opening is required in which the separating can is inserted and which must be fluid tightly sealed since the separating can is axially supported between the motor frame and the motor stator. This provides a very reliable fluidic separation of the dry motor chamber from the fluidic part of the fluid pump and, as a result, provides a very reliable electric motor.

In an embodiment of the present invention, the separating can can, for example, be made of a thermosetting plastic so that the separating can can be manufactured with low tolerances, i.e., the separating can can be manufactured very exactly. The air gap between the motor stator and the motor rotor, through which the separating can extends, can therefore be dimensioned relatively small which provides a higher motor efficiency.

The separating can can, for example, be supported via the axial support unilaterally in the first axial direction and be supported unilaterally in the second axial direction via a second axial support. The second axial support can, for example, be defined by the motor-frame-facing front side of the separating can which is directly supported by the motor frame in the second axial direction. This provides for an easy and reliable axial support of the separating can.

In an embodiment of the present invention, the motor frame can, for example, be provided with a separating can reception ring which axially protrudes from the motor frame and radially supports and positions the separating can. The reception ring can be arranged either inside or outside of the separating can. In the first case, the reception ring outside supports the separating can inside and, in the second case, the reception ring inside supports the separating can outside. The reception ring in any case provides an exact and reliable radial support and positioning of the separating can with respect to the motor frame and thereby with respect to the motor stator and the motor rotor.

The separating can reception ring can, for example, be provided with a least one positioning recess and the separating can can, for example, be provided with at least one corresponding positioning nose. The positioning nose radially protrudes from the axial support of the separating can and engages into the positioning recess to rotationally position the separating can with respect to the motor frame. The static rotational position of the separating can provides for an easy attachment of a magnetic field sensor to the outside of the separating can, wherein the magnetic field sensor can accurately determine the rotational position of the motor rotor.

In an embodiment of the present invention, the electric motor can, for example, be provided with a seal ring which fluidically seals a gap between the separating can and the motor frame, and the separating can can, for example, be provided with a seal support ring which surrounds the separating can and axially supports the seal ring. The seal ring radially surrounds the separating can and is arranged axially between the motor frame and the seal support ring. The seal support ring provides a reliable support of the seal ring and thereby a reliable sealing of the gap between the separating can and the motor frame.

The axial support can, for example, be defined by several support teeth which are distributed merlon-like along the circumference of the separating can. The circumferentially spaced teeth avoid a deformation of the separating can caused by a cooling shrinkage of the axial support during manufacturing. The several support teeth nevertheless provide a reliable axial support of the separating can by the motor stator.

In an embodiment of the present invention, the separating can can, for example, be provided with a rotor shaft reception which is only supported by the separating can, wherein the rotor shaft reception receives and supports a rotor shaft bearing. The rotor shaft bearing supports a pump-wheel-remote rotor shaft end so that no additional support is required for supporting the rotor shaft within the motor chamber. This provides a compact electric motor. Since the motor/pump housing does not support the rotor shaft, the housing contour can also be easily adapted to predefined installation space geometries, for example, within an engine compartment of a motor vehicle.

An embodiment of the present invention is described below under reference to the enclosed drawings.

The electric coolant pump 8 is provided with a canned electric motor 10 which is arranged in a dry motor chamber 12. The motor chamber 12 is fluidically separated from a pumping chamber 14 in which a rotatable pump wheel 16 is arranged and which is filled with a coolant. The motor chamber 12 and the pumping chamber 14 are axially separated from each other by a substantially radially extending motor frame 18.

The motor frame 18 is provided with a rotor shaft opening 20 and a separating can reception ring 22 surrounding the rotor shaft opening 20. The separating can reception ring 22 axially protrudes from the motor-chamber-facing side of the motor frame 18 and is provided with two diametrically opposite positioning recesses 24 at its front side.

The canned electric motor 10 comprises a permanently magnetized and rotatable motor rotor 26 and an electromagnetic and static motor stator 28. The motor stator 28 comprises a laminated stator body 32 and an electromagnetic stator coil 34. In the shown embodiment of the present invention, the stator body 32 is fixed to the motor frame 18 by several screws 35. The stator coil 34 is electrically energized by a motor electronics 36.

The motor rotor 26 and the motor stator 28 are fluidically separated from each other by a separating can 38 which, in the shown embodiment of the present invention, is made of a thermosetting plastic. The separating can 38 is provided with a substantially circular cross section and extends through the air gap between the motor rotor 26 and the motor stator 28.

The separating can 38 is provided with several support teeth 40 protruding from the radial outside of the separating can 38. The support teeth 40 are distributed merlon-like along the circumference of the separating can 38 and define a first axial support 42. The separating can 38 comprises a seal supporting ring 44 which is arranged at the pump-wheel-facing side of the first axial support 42 and surrounding the separating can 38. The separating can 38 is provided with two diametrically arranged positioning noses 46 radially protruding from the first axial support 42. The separating can 38 comprises a rotor shaft reception 48 which is located at the pump-wheel-remote axial end of the separating can 38. In the shown embodiment, the first axial support 42, the seal supporting ring 44, the positioning noses 46, and the rotor shaft reception 48 are provided integrally with the separating can 38.

The separating can 38 is introduced into and is radially supported by the separating can reception ring 22. The separating can 38 is supported in a first axial direction A1 which is remote from the pump wheel 16 by the stator body 32 via the first axial support 42. The separating can 38 is supported in a second axial direction A2 which is opposite to the first axial direction A1 by a second axial support 50 which, in the shown embodiment of the present invention, is defined by the motor-frame-facing front side 52 of the separating can 38. The separating can 38 is thereby only supported by the motor frame 18 and the motor stator 28.

The positioning noses 46 of the separating can 38 engage into the positioning recesses 24 of the separating can reception ring 22 to rotationally position the separating can 38 with respect to the motor frame 18.

The canned electric motor 10 is provided with a seal ring 54 which fluidically seals a gap between the motor frame 18 and the separating can 38. The seal ring 54 is radially supported by the inside of the separating can reception ring 22 and the outside of the separating can 38 and is axially supported by the motor frame 18 and the seal supporting ring 44 of the separating can 38.

The motor rotor 26 is co-rotatably connected with the pump wheel 16 via a rotor shaft 56 which extends through the rotor shaft opening 20 of the motor frame 18. The rotor shaft 56 is supported by a first rotor shaft bearing 58 and by a second rotor shaft bearing 60. The first rotor shaft bearing 58 is arranged within the rotor shaft opening 20 of the motor frame 18 and the second rotor shaft bearing 60 is received by the rotor shaft reception 48 of the separating can 38.

The present invention is not limited to embodiments described herein; reference should be had to the appended claims.

LIST OF REFERENCE NUMERALS 8 electric coolant pump
10 canned electric motor
12 motor chamber
14 pumping chamber
16 pump wheel
18 motor frame
20 rotor shaft opening
22 separating can reception ring
24 positioning recesses
26 motor rotor
28 motor stator
32 stator body
34 stator coil
35 screws
36 motor electronics
38 separating can
40 support teeth
42 first axial support
44 seal supporting ring
46 positioning noses
48 rotor shaft reception
50 second axial support
52 motor-frame-facing front side
54 seal ring
56 rotor shaft
58 first rotor shaft bearing
60 second rotor shaft bearing
A1 first axial direction
A2 second axial direction

What is claimed is:

1. A canned electric motor for a fluid pump, the canned electric motor comprising:
a static motor frame which extends substantially radially;
a rotor shaft;
a rotatable motor rotor which is co-rotatably connected with the rotor shaft;
a static motor stator comprising a stator body, the stator body being directly fixed to the static motor frame; and
a separating can which is configured to fluidically separate the static motor stator from the rotatable motor rotor, the separating can comprising a first axial support which is arranged to protrude radially from an outside of the separating can, the separating can being supported in a first axial direction by the stator body via the first axial support and in a second axial direction by the static motor frame, the first axial direction being opposite to the second axial direction,
wherein,
the static motor frame comprises a separating can reception ring which protrudes axially from the static motor frame and which is configured to radially support and position the separating can.

2. The canned electric motor as recited in claim 1, wherein the separating can is made of a thermosetting plastic.

3. The canned electric motor as recited in claim 1, wherein,
the separating can further comprises a second axial support,
the separating can is unilaterally supported via the first axial support in the first axial direction, and
the separating can is unilaterally supported in the second axial direction via the second axial support.

4. The canned electric motor as recited in claim 1, further comprising:
a seal ring which is configured to fluidically seal a gap between the separating can and the static motor frame,
wherein,
the separating can further comprises a seal support ring which is arranged to surround the separating can and which is configured to axially support the seal ring.

5. The canned electric motor as recited in claim 1, wherein the first axial support comprises a plurality of support teeth which are distributed merlon-like along a circumference of the separating can.

6. The canned electric motor as recited in claim 1, further comprising:
a rotor shaft bearing which is configured to support the rotor shaft,
wherein,
the separating can further comprises a rotor shaft reception which is only supported by the separating can, the rotor shaft reception being configured to receive and to support the rotor shaft bearing.

7. A canned electric motor for a fluid pump, the canned electric motor comprising:
a one-piece static motor frame which extends substantially radially;
a rotor shaft;
a rotatable motor rotor which is co-rotatably connected with the rotor shaft;
a static motor stator comprising a stator body, the stator body being directly fixed to the one-piece static motor frame; and
a separating can which is configured to fluidically separate the static motor stator from the rotatable motor rotor, the separating can comprising a first axial support which is arranged to protrude radially from an outside of the separating can, the separating can being supported in a first axial direction by the stator body via the first axial support and in a second axial direction by the one-piece static motor frame, the first axial direction being opposite to the second axial direction.

8. A canned electric motor for a fluid pump, the canned electric motor comprising:
a static motor frame which extends substantially radially;
a rotor shaft;

a rotatable motor rotor which is co-rotatably connected with the rotor shaft;

a static motor stator comprising a stator body, the stator body being directly fixed to the static motor frame;

a separating can which is configured to fluidically separate the static motor stator from the rotatable motor rotor, the separating can comprising a first axial support which is arranged to protrude radially from an outside of the separating can, the separating can being supported in a first axial direction by the stator body via the first axial support and in a second axial direction by the static motor frame, the first axial direction being opposite to the second axial direction; and a seal ring which is configured to fluidically seal a gap between the separating can and the static motor frame, wherein, the separating can further comprises a seal support ring which is arranged to surround the separating can and which is configured to axially support the seal ring.

9. The canned electric motor as recited in claim 8, wherein, the separating can further comprises a second axial support, the separating can is unilaterally supported via the first axial support in the first axial direction, and the separating can is unilaterally supported in the second axial direction via the second axial support.

10. The canned electric motor as recited in claim 8, wherein the static motor frame comprises a separating can reception ring which protrudes axially from the static motor frame and which is configured to radially support and position the separating can.

11. The canned electric motor as recited in claim 10, wherein, the separating can reception ring comprises at least one positioning recess, and the separating can further comprises at least one positioning nose which corresponds to the at least one positioning recess, the at least one positioning nose being configured to radially protrude from the first axial support and to engage into the at least one positioning recess so as to rotationally position the separating can with respect to the static motor frame.

12. The canned electric motor as recited in claim 8, wherein the first axial support comprises a plurality of support teeth which are distributed merlon-like along a circumference of the separating can.

13. The canned electric motor as recited in claim 8, further comprising:

a rotor shaft bearing which is configured to support the rotor shaft, wherein, the separating can further comprises a rotor shaft reception which is only supported by the separating can, the rotor shaft reception being configured to receive and to support the rotor shaft bearing.

14. A canned electric motor for a fluid pump, the canned electric motor comprising:

a static motor frame which extends substantially radially;

a rotor shaft;

a rotatable motor rotor which is co-rotatably connected with the rotor shaft;

a static motor stator comprising a stator body, the stator body being directly fixed to the static motor frame;

a separating can which is configured to fluidically separate the static motor stator from the rotatable motor rotor, the separating can comprising a first axial support which is arranged to protrude radially from an outside of the separating can, the separating can being supported in a first axial direction by the stator body via the first axial support and in a second axial direction by the static motor frame, the first axial direction being opposite to the second axial direction; and a rotor shaft bearing which is configured to support the rotor shaft, wherein, the separating can further comprises a rotor shaft reception which is only supported by the separating can, the rotor shaft reception being configured to receive and to support the rotor shaft bearing.

15. The canned electric motor as recited in claim 14, wherein the static motor frame comprises a separating can reception ring which protrudes axially from the static motor frame and which is configured to radially support and position the separating can.

16. The canned electric motor as recited in claim 15, wherein, the separating can reception ring comprises at least one positioning recess, and the separating can further comprises at least one positioning nose which corresponds to the at least one positioning recess, the at least one positioning nose being configured to radially protrude from the first axial support and to engage into the at least one positioning recess so as to rotationally position the separating can with respect to the static motor frame.

17. The canned electric motor as recited in claim 14, further comprising:

a seal ring which is configured to fluidically seal a gap between the separating can and the static motor frame, wherein, the separating can further comprises a seal support ring which is arranged to surround the separating can and which is configured to axially support the seal ring.

18. The canned electric motor as recited in claim 14, wherein the first axial support comprises a plurality of support teeth which are distributed merlon-like along a circumference of the separating can.

19. The canned electric motor as recited in claim 14, wherein, the separating can further comprises a second axial support, the separating can is unilaterally supported via the first axial support in the first axial direction, and the separating can is unilaterally supported in the second axial direction via the second axial support.

20. The canned electric motor as recited in claim 1, wherein, the separating can reception ring comprises at least one positioning recess, and the separating can further comprises at least one positioning nose which corresponds to the at least one positioning recess, the at least one positioning nose being configured to radially protrude from the first axial support and to engage into the at least one positioning recess so as to rotationally position the separating can with respect to the static motor frame.

* * * * *